United States Patent
Koo

(10) Patent No.: US 11,023,777 B1
(45) Date of Patent: Jun. 1, 2021

(54) METHODS FOR TRAINING AND TESTING OBFUSCATION NETWORK CAPABLE OF PERFORMING DISTINCT CONCEALING PROCESSES FOR DISTINCT REGIONS OF ORIGINAL IMAGE AND LEARNING AND TESTING DEVICES USING THE SAME

(71) Applicant: Deeping Source Inc., Seoul (KR)

(72) Inventor: Bon Hun Koo, Seoul (KR)

(73) Assignee: DEEPING SOURCE INC., Seoul (KR)

( * ) Notice: Subject to any disclaimer, the term of this patent is extended or adjusted under 35 U.S.C. 154(b) by 0 days.

(21) Appl. No.: 17/127,811

(22) Filed: Dec. 18, 2020

(30) Foreign Application Priority Data

Sep. 25, 2020 (KR) ........................ 10-2020-0124948

(51) Int. Cl.
*G06K 9/46* (2006.01)
*G06K 9/62* (2006.01)
*G06T 11/00* (2006.01)
*G06N 20/00* (2019.01)

(52) U.S. Cl.
CPC ............. *G06K 9/6256* (2013.01); *G06K 9/46* (2013.01); *G06N 20/00* (2019.01); *G06T 11/001* (2013.01)

(58) Field of Classification Search
CPC .......... G06K 9/6256; G06K 9/46; G06K 9/62; G06N 20/00; G06T 11/001
USPC ....... 382/100, 155, 173, 171, 232, 254, 276, 382/302, 304; 706/15; 726/26
See application file for complete search history.

(56) References Cited

U.S. PATENT DOCUMENTS

| | | | | |
|---|---|---|---|---|
| 9,477,913 | B2* | 10/2016 | Csurka | G06K 15/4095 |
| 10,546,216 | B1* | 1/2020 | Shachar | G06N 3/08 |
| 10,621,378 | B1* | 4/2020 | Kim | G06N 20/00 |
| 10,692,002 | B1* | 6/2020 | Kim | G06K 9/6256 |
| 2014/0208444 | A1* | 7/2014 | DeLuca | H04W 4/12 726/30 |
| 2019/0188830 | A1* | 6/2019 | Edwards | G06K 9/6215 |
| 2019/0258901 | A1* | 8/2019 | Albright | G06K 9/6255 |
| 2019/0295223 | A1* | 9/2019 | Shen | G06N 3/0454 |

* cited by examiner

*Primary Examiner* — Sheela C Chawan
(74) *Attorney, Agent, or Firm* — Bekiares Eliezer LLP

(57) ABSTRACT

A method for training an obfuscation network capable of performing distinct concealing processes for distinct regions of an original image is provided. The method includes steps of: a learning device (a) inputting a training image into the obfuscation network to generate an obfuscated training image by performing a 1-st to an n-th concealing process respectively on a 1-st to an n-th training region of the training image; (b) inputting the obfuscated training image into a 1-st to an n-th discriminator to respectively generate a 1-st to an n-th obfuscated image score on determining whether the obfuscated training image is real or fake, and inputting the obfuscated training image into an image recognition network to apply learning operation on the obfuscated training image to generate feature information for training; and (c) training the obfuscation network such that an accumulated loss is maximized, and an accuracy loss is minimized.

22 Claims, 9 Drawing Sheets

US 11,023,777 B1

METHODS FOR TRAINING AND TESTING OBFUSCATION NETWORK CAPABLE OF PERFORMING DISTINCT CONCEALING PROCESSES FOR DISTINCT REGIONS OF ORIGINAL IMAGE AND LEARNING AND TESTING DEVICES USING THE SAME

CROSS REFERENCE OF RELATED APPLICATION

This present application claims the benefit of the earlier filing date of Korean provisional patent application No. 10-2020-0124948, filed Sep. 25, 2020, the entire contents of which being incorporated herein by reference.

FIELD OF THE DISCLOSURE

The present disclosure relates to an obfuscation network capable of concealing an original image; and more particularly, to methods for training and testing the obfuscation network capable of performing distinct concealing processes for distinct regions of the original image, and learning and testing devices using the same.

BACKGROUND OF THE DISCLOSURE

Big data include structured data conventionally used in corporate environments or public institutions, as well as previously unutilized unstructured or semi-structured data, such as e-commerce data, metadata, web log data, RFID (Radio Frequency Identification) data, sensor network data, social network data, data related to internet texts and documents, internet search indexing data, etc. Such data are generally referred to as the big data in the sense that their vast amounts are difficult to be handled by ordinary software tools and computer systems.

While the big data may not contain any particular meanings by themselves, they are used in various fields for creating new data or for making judgments or predictions, such as through a data pattern analysis using machine learning.

In recent years, reinforcements have been made to personal information protection laws such that it has become mandatory to obtain consents from data owners or delete any information capable of identifying individuals if one were to share or trade the big data. However, since it is practically impossible or difficult to check every data included in the vast amount of the big data for any personal information or receive consent from the data owners, various concealing technologies are emerging to support use of the big data.

As an example of a related prior art, a technique is disclosed in Korean Patent Registration No. 1861520. According to this technique, a face-concealing method is provided which includes a detection step of detecting a facial region of a person in an input image to be transformed, a first concealing step of transforming the detected facial region into a distorted first image that does not have a facial shape of the person so that the person in the input image is prevented from being identified, and a second concealing step of generating a second image having a contrasting facial shape based on the first image, transforming the first image into the second image, in the input image, where the second image is generated to have a facial shape different from that of the facial region detected in the detection step.

Conventional concealing technologies including the concealing technique described above generally follow steps of detecting regions of interest containing personal information, such as texts or faces, etc., from original images and then applying masks, blurs, or distortions on the detected regions of interest to prevent personal information from being exposed.

However, the conventional concealing technologies has a disadvantage in that any detection failure or personal information not included as concealing targets can lead to the personal information exposure since undetected personal information would be left unconcealed.

On the other hand, if an excessive concealing process is performed on the regions of interest to prevent the personal information exposure, extraction of information necessary for a specific use of the big data may become difficult due to information loss.

Therefore, an enhanced method for solving the aforementioned problems is required.

SUMMARY OF THE DISCLOSURE

It is an object of the present disclosure to solve all the aforementioned problems.

It is another object of the present disclosure to generate an obfuscated image by concealing an original image such that the obfuscated image is unidentifiable by naked eyes while is recognized to be the same as the original image in learning networks.

It is still another object of the present disclosure to perform concealing processes sufficient enough to make it impossible to infer important features from the obfuscated image while preserving the important features to be used for training the learning networks.

It is still yet another object of the present disclosure to generate the obfuscated image by concealing the original image such that the obfuscated image is unidentifiable by naked eyes while specific regions on the obfuscated image are recognized to be the same as or similar to their corresponding specific regions of the original image in the learning networks.

It is still yet another object of the present disclosure to generate the obfuscated image by irreversibly performing the concealing processes on a 1-st region to an n-th region of the original image such that the obfuscated image does not include any information identifiable by the naked eyes.

It is still yet another object of the present disclosure to customize the concealing processes according to specific uses of the obfuscated images by performing varying degrees of concealing on different regions of the original image.

It is still yet another object of the present disclosure to stimulate big data trading market.

In accordance with one aspect of the present disclosure, there is provided a method for training an obfuscation network capable of performing distinct concealing processes for distinct regions of an original image, including steps of: (a) a learning device performing or supporting another device to perform a process of inputting at least one training image into an obfuscation network, to thereby allow the obfuscation network to perform a 1-st concealing process to an n-th concealing process respectively on a 1-st training region to an n-th training region of the training image, wherein n is an integer larger than or equal to 2, and thus to generate at least one obfuscated training image corresponding to the training image; (b) the learning device performing or supporting another device to perform processes of (i) inputting the obfuscated training image into a 1-st discriminator to an n-th discriminator capable of determining a 1-st reference image to an n-th reference image respectively as real, wherein the 1-st reference image to the n-th reference image are respectively generated by applying the 1-st concealing process to the n-th concealing process to an entire region of the training image, to thereby allow the 1-st discriminator to the n-th discriminator to respectively generate a 1-st obfuscated image score to an n-th obfuscated image score on determining whether the obfuscated training image is real or fake, and (ii) inputting the obfuscated training image into an image recognition network, to thereby allow the image recognition network to apply learning operation on the obfuscated training image and thus to generate feature information for training corresponding to the obfuscated training image; and (c) the learning device performing or supporting another device to perform a process of training the obfuscation network such that (i) an accumulated loss generated by computing a weighted sum of a (1_1)-st discriminator loss to an (n_1)-st discriminator loss is maximized, wherein the (1_1)-st discriminator loss to the (n_1)-st discriminator loss are generated by respectively referring to the 1-st obfuscated image score to the n-th obfuscated image score, and (ii) an accuracy loss generated by referring to the feature information for training and its corresponding ground truth or generated by referring to a task-specific output and its corresponding ground truth is minimized, wherein the task-specific output is generated from the feature information for training.

As one example, the method further includes a step of: (d) the learning device performing or supporting another device to perform a process of training the 1-st discriminator to the n-th discriminator such that (i) the (1_1)-st discriminator loss to the (n_1)-st discriminator loss calculated by respectively referring to the 1-st obfuscated image score to the n-th obfuscated image score are minimized and (ii) a (1_2)-nd discriminator loss to an (n_2)-nd discriminator loss calculated by respectively referring to a 1-st reference image score to an n-th reference image score are maximized, wherein the 1-st reference image score to the n-th reference image score are generated by respectively referring to the 1-st reference image to the n-th reference image respectively inputted into the 1-st discriminator to the n-th discriminator.

As another example, the method further includes a step of: (e) the learning device performing or supporting another device to perform a process of training the image recognition network such that the accumulated loss is minimized.

As another example, during the process of training the obfuscation network by using the accumulated loss, the learning device performs or supports another device to perform a process of applying a largest weight to a (k_1)-st discriminator loss, for a k-th training region, among the (1_1)-st discriminator loss to the (n_1)-st discriminator loss, wherein the k-th training region is among the 1-st training region to the n-th training region of the training image, and wherein k is an integer larger than or equal to 1 and smaller than or equal to n.

As another example, the learning device performs or supports another device to perform a process of allowing the obfuscation network to conceal the training image such that (i) the 1-st training region is concealed with a lowest degree of noise through the 1-st concealing process and (ii) the n-th training region is concealed with a highest degree of noise through the n-th concealing process.

As another example, the learning device performs or supports another device to perform a process of determining the 1-st training region to the n-th training region such that (i) the 1-st training region includes a largest number of latent features among the 1-st training region to the n-th training region and (ii) the n-th training region includes a smallest number of latent features among the 1-st training region to the n-th training region.

As another example, the learning device performs or supports another device to perform (i) a process of acquiring region information on the 1-st training region to the n-th training region from labeling information for training which specifies the 1-st training region to the n-th training region, and inputting the region information into the obfuscation network, or (ii) a process of inputting the training image into an attention network, to thereby allow the attention network to generate a heatmap for training corresponding to the training image, acquiring the region information on the 1-st training region to the n-th training region from the heatmap for training, and inputting the region information into the obfuscation network.

In accordance with another aspect of the present disclosure, there is provided a method for testing an obfuscation network capable of performing distinct concealing processes for distinct regions of an original image, including steps of: (a) on condition that a learning device has performed or supported another device to perform processes of (i) inputting at least one training image into an obfuscation network, to thereby allow the obfuscation network to perform a 1-st concealing process to an n-th concealing process respectively on a 1-st training region to an n-th training region of the training image, wherein n is an integer larger than or equal to 2, and thus to generate at least one obfuscated training image corresponding to the training image, (ii) (ii-1) inputting the obfuscated training image into a 1-st discriminator to an n-th discriminator capable of determining a 1-st reference image to an n-th reference image respectively as real, wherein the 1-st reference image to the n-th reference image are respectively generated by applying the 1-st concealing process to the n-th concealing process to an entire region of the training image, to thereby allow the 1-st discriminator to the n-th discriminator to respectively generate a 1-st obfuscated image score to an n-th obfuscated image score on determining whether the obfuscated training image is real or fake, and (ii-2) inputting the obfuscated training image into an image recognition network, to thereby allow the image recognition network to apply learning operation on the obfuscated training image and thus to generate feature information for training corresponding to the obfuscated training image, and (iii) training the obfuscation network such that (iii-1) an accumulated loss generated by computing a weighted sum of a (1_1)-st discriminator loss to an (n_1)-st discriminator loss is maximized, wherein the (1_1)-st discriminator loss to the (n_1)-st discriminator loss are generated by respectively referring to the 1-st obfuscated image score to the n-th obfuscated image score, and (iii-2) an accuracy loss generated by referring to the feature information for training and its corresponding ground truth or generated by referring to a task-specific output and its corresponding ground truth is minimized, wherein the task-specific output is generated from the feature information for training, a testing device, performing or supporting another device to perform a process of acquiring at least one test image; and (b) the testing device performing or supporting another device to perform a process of inputting the test image into the obfuscation network, to thereby allow the obfuscation network to perform the 1-st concealing process to the n-th concealing process respectively on a 1-st test region to an n-th test region of the test image and thus to generate at least one obfuscated test image corresponding to the test image.

As one example, the testing device performs or supports another device to perform a process of allowing the obfuscation network to conceal the test image such that (i) the 1-st test region is concealed with a lowest degree of noise through the 1-st concealing process and (ii) the n-th test region is concealed with a highest degree of noise through the n-th concealing process.

As another example, the testing device performs or supports another device to perform a process of determining the 1-st test region to the n-th test region such that (i) the 1-st test region includes a largest number of latent features among the 1-st test region to the n-th test region and (ii) the n-th test region includes a smallest number of latent features among the 1-st test region to the n-th test region.

As another example, the testing device performs or supports another device to perform (i) a process of acquiring region information on the 1-st test region to n-th test region from labeling information for testing which specifies the 1-st test region to the n-th test region, and inputting the region information into the obfuscation network, or (ii) a process of inputting the test image into an attention network, to thereby allow the attention network to generate a heatmap for testing corresponding to the test image, acquiring the region information on the 1-st test region to the n-th test region from the heatmap for testing, and inputting the region information into the obfuscation network.

In accordance with still another aspect of the present disclosure, there is provided a learning device for training an obfuscation network capable of performing distinct concealing processes for distinct regions of an original image, including: at least one memory that stores instructions; and at least one processor configured to execute the instructions to perform or support another device to perform: (I) a process of inputting at least one training image into an obfuscation network, to thereby allow the obfuscation network to perform a 1-st concealing process to an n-th concealing process respectively on a 1-st training region to an n-th training region of the training image, wherein n is an integer larger than or equal to 2, and thus to generate at least one obfuscated training image corresponding to the training image, (II) processes of (i) inputting the obfuscated training image into a 1-st discriminator to an n-th discriminator capable of determining a 1-st reference image to an n-th reference image respectively as real, wherein the 1-st reference image to the n-th reference image are respectively generated by applying the 1-st concealing process to the n-th concealing process to an entire region of the training image, to thereby allow the 1-st discriminator to the n-th discriminator to respectively generate a 1-st obfuscated image score to an n-th obfuscated image score on determining whether the obfuscated training image is real or fake, and (ii) inputting the obfuscated training image into an image recognition network, to thereby allow the image recognition network to apply learning operation on the obfuscated training image and thus to generate feature information for training corresponding to the obfuscated training image, and (III) a process of training the obfuscation network such that (i) an accumulated loss generated by computing a weighted sum of a (1_1)-st discriminator loss to an (n_1)-st discriminator loss is maximized, wherein the (1_1)-st discriminator loss to the (n_1)-st discriminator loss are generated by respectively referring to the 1-st obfuscated image score to the n-th obfuscated image score, and (ii) an accuracy loss generated by referring to the feature information for training and its corresponding ground truth or generated by referring to a task-specific output and its corresponding ground truth is minimized, wherein the task-specific output is generated from the feature information for training.

As one example, the processor performs or supports another device to perform: (IV) a process of training the 1-st discriminator to the n-th discriminator such that (i) the (1_1)-st discriminator loss to the (n_1)-st discriminator loss calculated by respectively referring to the 1-st obfuscated image score to the n-th obfuscated image score are minimized and (ii) a (1_2)-nd discriminator loss to an (n_2)-nd discriminator loss calculated by respectively referring to a 1-st reference image score to an n-th reference image score are maximized, wherein the 1-st reference image score to the n-th reference image score are generated by respectively referring to the 1-st reference image to the n-th reference image respectively inputted into the 1-st discriminator to the n-th discriminator.

As another example, the processor performs or supports another device to perform: (V) a process of training the image recognition network such that the accumulated loss is minimized.

As another example, during the process of training the obfuscation network by using the accumulated loss, the processor performs or supports another device to perform a process of applying a largest weight to a (k_1)-st discriminator loss, for a k-th training region, among the (1_1)-st discriminator loss to the (n_1)-st discriminator loss, wherein the k-th training region is among the 1-st training region to the n-th training region of the training image, and wherein k is an integer larger than or equal to 1 and smaller than or equal to n.

As another example, the processor performs or supports another device to perform a process of allowing the obfuscation network to conceal the training image such that (i) the 1-st training region is concealed with a lowest degree of noise through the 1-st concealing process and (ii) the n-th training region is concealed with a highest degree of noise through the n-th concealing process.

As another example, the processor performs or supports another device to perform a process of determining the 1-st training region to the n-th training region such that (i) the 1-st training region includes a largest number of latent features among the 1-st training region to the n-th training region and (ii) the n-th training region includes a smallest number of latent features among the 1-st training region to the n-th training region.

As another example, the processor performs or supports another device to perform (i) a process of acquiring region information on the 1-st training region to the n-th training region from labeling information for training which specifies the 1-st training region to the n-th training region, and inputting the region information into the obfuscation network, or (ii) a process of inputting the training image into an attention network, to thereby allow the attention network to generate a heatmap for training corresponding to the training image, acquiring the region information on the 1-st training region to the n-th training region from the heatmap for training, and inputting the region information into the obfuscation network.

In accordance with still yet another aspect of the present disclosure, there is provided a testing device for testing an obfuscation network capable of performing distinct concealing processes for distinct regions of an original image, including: at least one memory that stores instructions; and at least one processor configured to execute the instructions to perform or support another device to perform: (I) on condition that a learning device has performed or supported another device to perform processes of (i) inputting at least one training image into an obfuscation network, to thereby allow the obfuscation network to perform a 1-st concealing process to an n-th concealing process respectively on a 1-st training region to an n-th training region of the training image, wherein n is an integer larger than or equal to 2, and thus to generate at least one obfuscated training image corresponding to the training image, (ii) (ii-1) inputting the obfuscated training image into a 1-st discriminator to an n-th discriminator capable of determining a 1-st reference image to an n-th reference image respectively as real, wherein the 1-st reference image to the n-th reference image are respectively generated by applying the 1-st concealing process to the n-th concealing process to an entire region of the training image, to thereby allow the 1-st discriminator to the n-th discriminator to respectively generate a 1-st obfuscated image score to an n-th obfuscated image score on determining whether the obfuscated training image is real or fake, and (ii-2) inputting the obfuscated training image into an image recognition network, to thereby allow the image recognition network to apply learning operation on the obfuscated training image and thus to generate feature information for training corresponding to the obfuscated training image, and (iii) training the obfuscation network such that (iii-1) an accumulated loss generated by computing a weighted sum of a (1_1)-st discriminator loss to an (n_1)-st discriminator loss is maximized, wherein the (1_1)-st discriminator loss to the (n_1)-st discriminator loss are generated by respectively referring to the 1-st obfuscated image score to the n-th obfuscated image score, and (iii-2) an accuracy loss generated by referring to the feature information for training and its corresponding ground truth or generated by referring to a task-specific output and its corresponding ground truth is minimized, wherein the task-specific output is generated from the feature information for training, (I-1) a process of acquiring at least one test image, and (II) a process of inputting the test image into the obfuscation network, to thereby allow the obfuscation network to perform the 1-st concealing process to the n-th concealing process respectively on a 1-st test region to an n-th test region of the test image and thus to generate at least one obfuscated test image corresponding to the test image.

As one example, the processor performs or supports another device to perform a process of allowing the obfuscation network to conceal the test image such that (i) the 1-st test region is concealed with a lowest degree of noise through the 1-st concealing process and (ii) the n-th test region is concealed with a highest degree of noise through the n-th concealing process.

As another example, the processor performs or supports another device to perform a process of determining the 1-st test region to the n-th test region such that (i) the 1-st test region includes a largest number of latent features among the 1-st test region to the n-th test region and (ii) the n-th test region includes a smallest number of latent features among the 1-st test region to the n-th test region.

As another example, the processor performs or supports another device to perform (i) a process of acquiring region information on the 1-st test region to n-th test region from labeling information for testing which specifies the 1-st test region to the n-th test region, and inputting the region information into the obfuscation network, or (ii) a process of inputting the test image into an attention network, to thereby allow the attention network to generate a heatmap for testing corresponding to the test image, acquiring the region information on the 1-st test region to the n-th test region from the heatmap for testing, and inputting the region information into the obfuscation network.

In addition, recordable media that are readable by a computer for storing a computer program to execute the method of the present disclosure is further provided.

BRIEF DESCRIPTION OF THE DRAWINGS

The above and other objects and features of the present disclosure will become apparent from the following description of preferred embodiments given in conjunction with the accompanying drawings. The accompanying drawings used to explain example embodiments of the present disclosure are only part of example embodiments of the present disclosure and other drawings can be obtained based on the drawings by those skilled in the art of the present disclosure without inventive work.

DETAILED DESCRIPTION OF THE PREFERRED EMBODIMENTS

Figure 1:
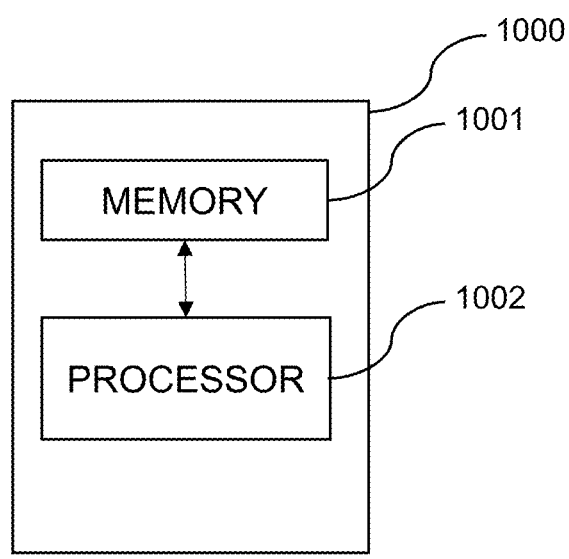
FIG. 1 is a drawing schematically illustrating a learning device for training an obfuscation network capable of performing distinct concealing processes for distinct regions of an original image in accordance with one example embodiment of the present disclosure.

In the following detailed description, reference is made to the accompanying drawings that show, by way of illustration, specific embodiments in which the disclosure may be practiced. These embodiments are described in sufficient detail to enable those skilled in the art to practice the disclosure. It is to be understood that the various embodiments of the present disclosure, although different, are not necessarily mutually exclusive. For example, a particular feature, structure, or characteristic described herein in connection with one embodiment may be implemented within other embodiments without departing from the spirit and scope of the present disclosure. In addition, it is to be understood that the position or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range of equivalents to which the claims are entitled. In the drawings, like numerals refer to the same or similar functionality throughout several aspects.

Any images referred to in the present disclosure may include images related to any roads paved or unpaved, in which case the objects on the roads or near the roads may include vehicles, persons, animals, plants, buildings, flying objects like planes or drones, or any other obstacles which may appear in a road-related scene, but the scope of the present disclosure is not limited thereto. As another example, said any images referred to in the present disclosure may include images not related to any roads, such as images related to alleyway, land lots, sea, lakes, rivers, mountains, forests, deserts, sky, or any indoor space, in which case the objects in said any images may include vehicles, persons, animals, plants, buildings, flying objects like planes or drones, ships, amphibious planes or ships, or any other obstacles which may appear in a scene related to alleyway, land lots, sea, lakes, rivers, mountains, forests, deserts, sky, or any indoor space, but the scope of the present disclosure is not limited thereto.

Besides, in the detailed description and claims of the present disclosure, a term "include" and its variations are not intended to exclude other technical features, additions, components or steps. Other objects, benefits and features of the present disclosure will be revealed to one skilled in the art, partially from the specification and partially from the implementation of the present disclosure. The following examples and drawings will be provided as examples but they are not intended to limit the present disclosure.

The headings and abstract of the present disclosure provided herein are for convenience only and do not limit or interpret the scope or meaning of the embodiments.

For reference, throughout the present disclosure, the phrase "for training" or "training" is added to terms related to training processes, and the phrase "for testing", "testing", or "test" is added to terms related to testing processes, to avoid possible confusion.

As used in this specification and the appended claims, the singular forms "a," "an," and "the" may include plural referents unless the content and context clearly dictates otherwise.

To allow those skilled in the art to carry out the present disclosure easily, the example embodiments of the present disclosure will be explained by referring to attached diagrams in detail as shown below.

FIG. 1 is a drawing schematically illustrating a learning device 1000 for training an obfuscation network capable of performing distinct concealing processes for distinct regions of an original image in accordance with one example embodiment of the present disclosure.

By referring to FIG. 1, the learning device 1000 may include a memory 1001 for storing instructions to train the obfuscation network capable of performing the distinct concealing processes for the distinct regions of the original image, and a processor 1002 for performing processes to train the obfuscation network capable of performing the distinct concealing processes for the distinct regions of the original image according to the instructions in the memory 1001.

Specifically, the learning device 1000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

Meanwhile, the learning device 1000 may be a server or a device for performing the concealing processes on the original image, and may perform the concealing process while being installed on a computing device that is linked to a sever, a terminal, or a device generating the original image, but the present disclosure is not limited thereto.

A method of training the obfuscation network capable of performing the distinct concealing processes for the distinct regions of the original image in accordance with one example embodiment of the present disclosure by using the leaning device 1000 configured as explained above is described by referring to FIG. 2 to FIG. 7.

Herein, the original image inputted into the obfuscation network 100 may refer to an image inputted into the obfuscation network 100 during learning, testing, and inferencing processes such that the obfuscation network 100 may perform the concealing processes thereon to produce an obfuscated image. As such, in the present disclosure, the original image may be referred to as a training image or a test image inputted into the obfuscation network 100 during the learning and the testing processes.

Figure 2:
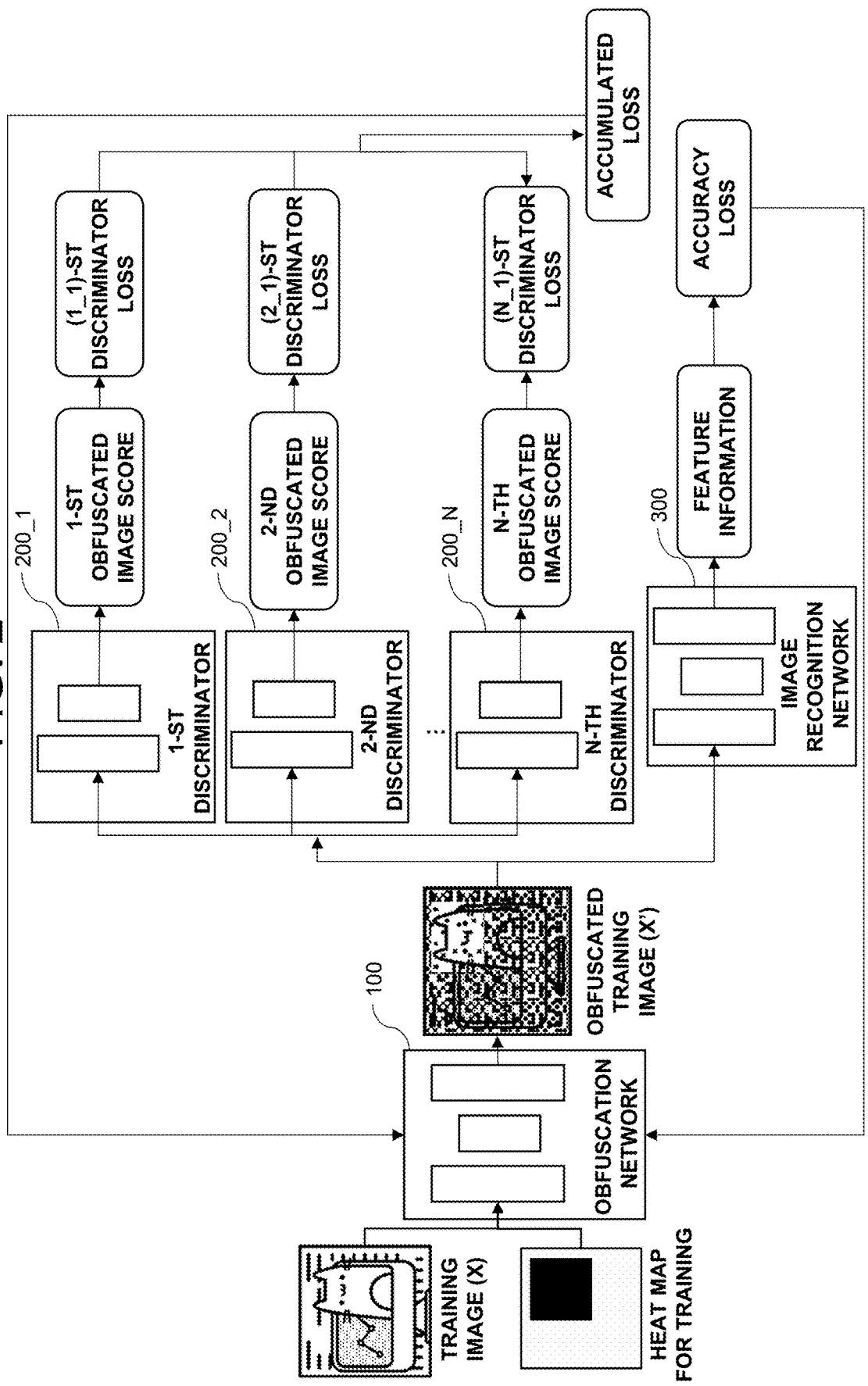
FIG. 2 is a drawing schematically illustrating a method for training the obfuscation network capable of performing the distinct concealing processes for the distinct regions of the original image in accordance with one example embodiment of the present disclosure.

First, FIG. 2 is a drawing schematically illustrating a method for training the obfuscation network 100 capable of performing the distinct concealing processes for the distinct regions of the original image in accordance with one example embodiment of the present disclosure. That is, FIG. 2 is schematically illustrating a method for training the obfuscation network 100 capable of performing the distinct concealing processes for distinct regions of the training image X in accordance with one example embodiment of the present disclosure.

When at least one training image X is acquired, the learning device 1000 may perform or support another device to perform a process of inputting the training image X into an obfuscation network 100, to thereby allow the obfuscation network 100 to perform a 1-st concealing process to an n-th concealing process respectively on a 1-st training region to an n-th training region of the training image X, wherein n is an integer larger than or equal to 2, and thus to generate at least one obfuscated training image X' corresponding to the training image X.

Herein, the obfuscation network 100 may generate the obfuscated training image X' by concealing the distinct regions of the training image X with the distinct concealing processes. For example, degrees of concealing of the distinct concealing processes may be varied such that the 1-st training region to the n-th training region of the training image X are concealed with distinct degrees of concealing. Also, the obfuscation network 100 may simultaneously perform the 1-st concealing process to the n-th concealing process such that the 1-st training region to the n-th training region of the training image X are respectively concealed with the 1-st concealing process to the n-th concealing process. That is, the obfuscation network 100 may conceal the training image X by conjointly using the 1-st concealing process to the n-th concealing process, so that the 1-st training region to the n-th training region of the training image X are respectively concealed with the 1-st concealing process to the n-th concealing process.

Herein, the learning device 1000 may perform or support another device to perform a process of determining the 1-st training region to the n-th training region in an order of decremental number of latent features such that (i) the 1-st training region includes a largest number of latent features among the 1-st training region to the n-th training region and (ii) the n-th training region includes a smallest number of latent features among the 1-st training region to the n-th training region. Therefore, the learning device 1000 may perform or support another device to perform a process of allowing the obfuscation network 100 to conceal the training image X with an incremental degree of noise such that (i) the 1-st training region is concealed with a lowest degree of noise through the 1-st concealing process and (ii) the n-th training region is concealed with a highest degree of noise through the n-th concealing process.

To this end, the learning device 1000 may perform or support another device to perform (i) a process of acquiring region information on the 1-st training region to the n-th training region from labeling information for training which specifies the 1-st training region to the n-th training region, and inputting the region information into the obfuscation network 100, or (ii) a process of inputting the training image X into an attention network, to thereby allow the attention network to generate a heatmap for training corresponding to the training image X, acquiring the region information on the 1-st training region to the n-th training region from the heatmap for training, and inputting the region information into the obfuscation network 100.

Herein, in the process of acquiring the region information on the 1-st training region to the n-th training region from the labeling information for training which specifies the 1-st training region to the n-th training region, the region information may be generated by manually setting the 1-st training region to the n-th training region. On the other hand, the labeling information for training may also be generated using a machine learning based segmentation network by segmenting the training image X into the 1-st training region to the n-th training region, or using a machine learning based regression network by obtaining bounding boxes of objects included in the training image X.

Accordingly, when the region information is acquired, the learning device 1000 may input the region information into the obfuscation network 100, to thereby allow the obfuscation network 100 to perform the 1-st concealing process to the n-th concealing process corresponding respectively to the region information on the 1-st training region to the n-th training region.

Figure 3:
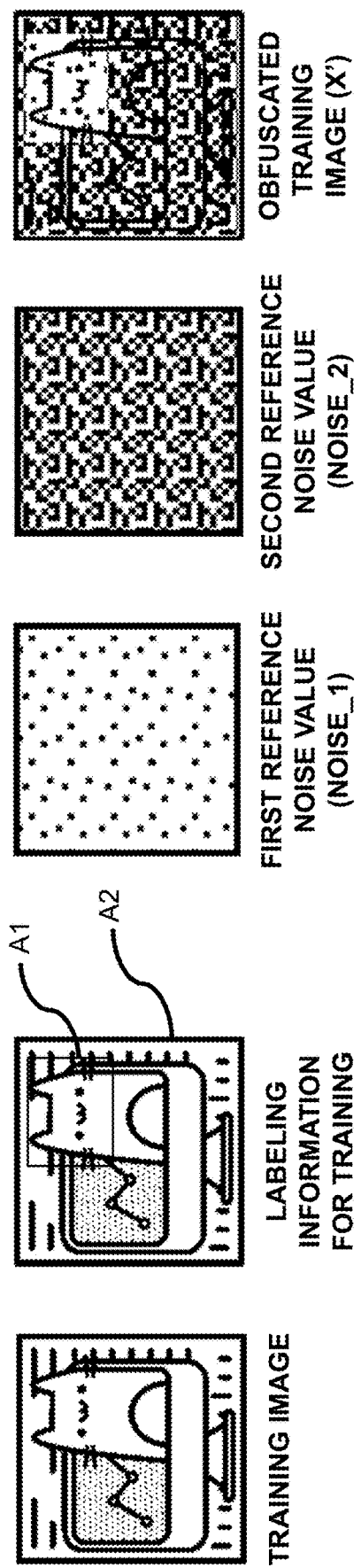
FIG. 3 is a drawing schematically illustrating examples of a training image, labeling information for training, reference noise values, and an obfuscated training image used for training the obfuscation network capable of performing the distinct concealing processes for the distinct regions of the original image in accordance with one example embodiment of the present disclosure.

For example, given that the labeling information for training as schematically illustrated in FIG. 3 is acquired, the obfuscation network 100 may refer to the labeling information for training, thus to apply a larger weight to a first noise reference value Noise_1 than to a second noise reference value Noise_2 for a first training region marked as A1, and apply a larger weight to the second noise reference value Noise_2 than to the first noise reference value Noise_1 for a second training region marked as A2. In response to dividing an entire region of the training image X into the two concealable training regions, A1 and A2, the resulting training image X' has its entire region concealed with the two distinct noise reference values, Noise_1 and Noise_2, as shown in FIG. 3. However, the present disclosure is not limited thereto, and the present disclosure may determine at least some parts of the training image X as the 1-st training region to the n-th training region so that only those parts marked as the 1-st training region to the n-th training region are respectively concealed with the 1-st concealing process to the n-th concealing process.

On the other hand, in the process of inputting the training image X into the attention network, to thereby allow the attention network to generate the heatmap for training corresponding to the training image X, the learning device 1000 may input the training image X into the attention network, to thereby allow the attention network to highlight specific regions containing richer number of latent features in comparison to the other regions of the training image X. Herein, said "richer number of latent features" may be determined as a number of latent features larger than a preset threshold. Also, the specific regions containing the richer number of the latent features may include analyzable features such as texts, humans, animals, vehicles, faces, buildings, etc. Further, depending on which purpose the obfuscated training image X' is being used, the latent features detected may vary. To provide an example, when the obfuscated training image X' is used for traffic scene analysis, features such as pedestrians, vehicles, road signs, lanes, etc., may be detected as the latent features on the training image X. Herein, the attention network used for generating the heatmap for training may have been trained in advance.

Figure 4:
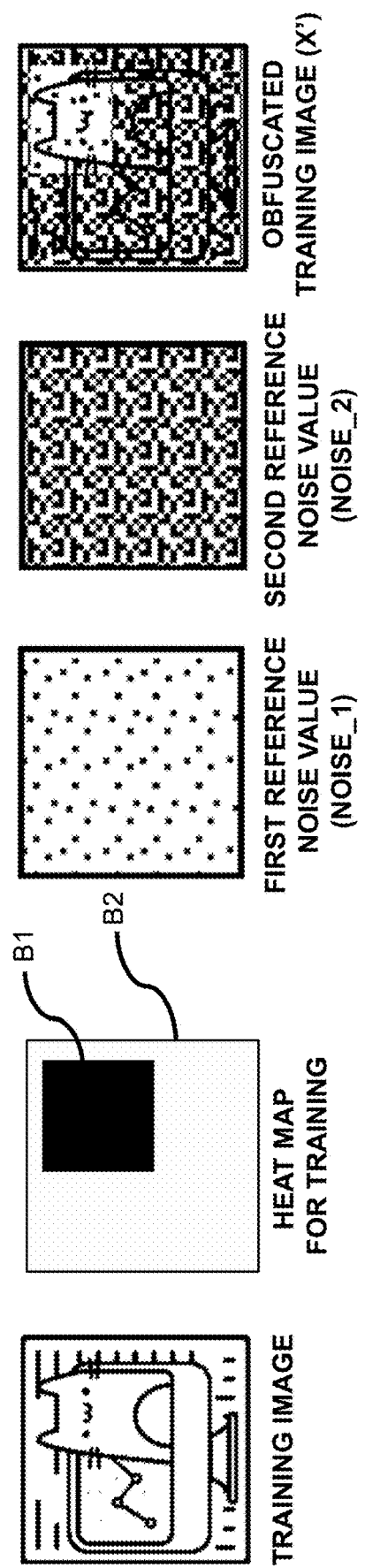
FIG. 4 is a drawing schematically illustrating examples of the training image, a heatmap for training, the reference noise values, and the obfuscated training image used for training the obfuscation network capable of performing the distinct concealing processes for the distinct regions of the original image in accordance with one example embodiment of the present disclosure.

For example, given that a heatmap for training as schematically illustrated in FIG. 4 is acquired, the obfuscation network 100 may refer to the heatmap for training, thus to apply a larger weight to the first noise reference value Noise_1 than to the second noise reference value Noise_2 for a first training region marked as B1, and apply a larger weight to the second noise reference value Noise_2 than to the first noise reference value Noise_1 for a second training region marked as B2. In response to dividing an entire region of the training image X into the two concealable training regions, B1 and B2, the resulting training image X' has its entire region concealed with the two distinct noise reference values, Noise_1 and Noise_2, as shown in FIG. 3. However, the present disclosure is not limited thereto, and the present disclosure may determine at least some parts of the training image X as the 1-st training region to the n-th training region so that only those parts marked as the 1-st training region to the n-th training region are respectively concealed with the 1-st concealing process to the n-th concealing process.

Figure 5:
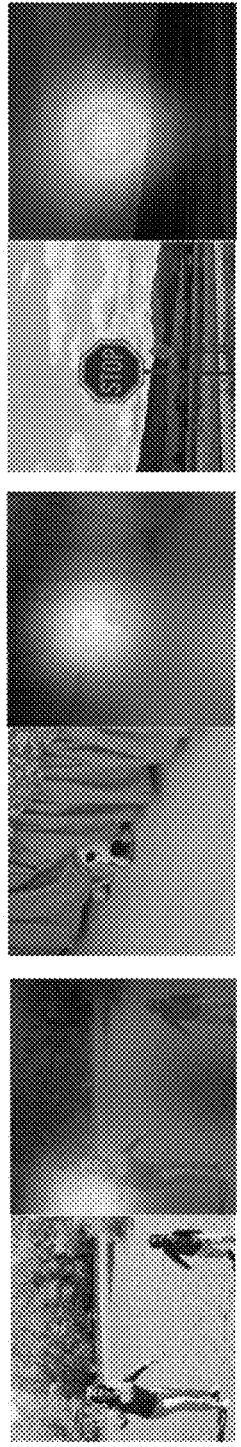
FIG. 5 is a drawing schematically illustrating examples of attention regions highlighted by an attention network on example images in accordance with one example embodiment of the present disclosure.

By referring to FIG. 5, in order to generate the heatmap for training as described above, the attention network may highlight regions including information required for data analysis by determining regions containing richer number of latent features in comparison to the other regions of the training image X. For reference, FIG. 5 shows possible outputs of the attention network described in the paper "Show, Attend and tell: Neural Image caption Generation with Visual Attention, Kelvin Xu et al, 2016".

Herein, said attention network adopted in the present disclosure may be included in a particular network configuration necessary for carrying out a particular task of generating the heatmap for training, such as by referring to the regions that are highlighted. Further, following the present disclosure, the attention network may be located externally to generate the heatmap for training, but the present disclosure may also encompass cases where the attention network is incorporated into or linked to the obfuscation network 100 to directly generate the heatmap for training.

Meanwhile, the obfuscated image X' generated by the obfuscation network 100 may be recognized to be unidentifiable by naked eyes, but may be recognized to be similar to or the same as the original image in learning networks.

Also, as one example, the obfuscation network 100 may include an encoder having one or more convolutional layers for applying one or more convolution operations to the inputted training image X, and a decoder having one or more deconvolutional layers for applying one or more deconvolution operations to at least one feature map outputted from the encoder to thereby generate the obfuscated training image X', but the scope of the present disclosure is not limited thereto, and may include any learning networks having various structures capable of obfuscating the inputted training data X.

Next, by referring to FIG. 2 again, the learning device 1000 may perform or support another device to perform a process of inputting the obfuscated training image X' into a 1-st discriminator 200_1 to an n-th discriminator 200_n capable of determining a 1-st reference image to an n-th reference image respectively as real, wherein the 1-st reference image to the n-th reference image are respectively generated by applying the 1-st concealing process to the n-th concealing process to the entire region of the training image X, to thereby allow the 1-st discriminator 200_1 to the n-th discriminator 200_n to respectively generate a 1-st obfuscated image score to an n-th obfuscated image score on determining whether the obfuscated training image X' is real or fake.

Herein, a maximum value of an image score yielded by the 1-st discriminator 200_1 to the n-th discriminator 200_n for an inputted image is 1 which is a value of determining the inputted image as real, and a minimum value of the image score yielded by the 1-st discriminator 200_1 to the n-th discriminator 200_n for the inputted image is 0 which is a value of determining the inputted image as fake.

Next, the learning device 1000 may perform or support another device to perform a process of inputting the obfuscated training image X' into an image recognition network 300, to thereby allow the image recognition network 300 to apply learning operation on the obfuscated training image X' and thus to generate feature information for training corresponding to the obfuscated training image X'.

Herein, the image recognition network 300 may include a machine learning network, wherein the machine learning network may include at least one of a k-Nearest Neighbors, a Linear Regression, a Logistic Regression, a Support Vector Machine (SVM), a Decision Tree and Random Forest, a Neural Network, a Clustering, a Visualization and a Dimensionality Reduction, an Association Rule Learning, a Deep Belief Network, a Reinforcement Learning, and a Deep learning algorithm, but the machine learning network is not limited thereto and may include various learning algorithms.

Additionally, the feature information for training may be features or logits corresponding to the obfuscated training image X'. Also, the feature information for training may be feature values related to certain features in the obfuscated training image X', or the logits including values related to at least one of vectors, matrices, and coordinates related to the certain features.

Thereafter, the learning device 1000 may obtain losses from the 1-st discriminator 200_1 to the n-th discriminator 200_n and those from the image recognition network 300, to thereby train the obfuscation network 100, the 1-st discriminator 200_1 to the n-th discriminator 200_n, and the image recognition network 300.

First, the learning device 1000 may generate an accumulated loss by computing a weighted sum of a (1_1)-st discriminator loss to an (n_1)-st discriminator loss, wherein the (1_1)-st discriminator loss to the (n_1)-st discriminator loss are generated respectively from the 1-st discriminator 200_1 to the n-th discriminator 200_n by respectively referring to the 1-st obfuscated image score to the n-th obfuscated image score.

Herein, when acquiring the accumulated loss, the learning device 1000 may compute the weighted sum of the (1_1)-st discriminator loss to the (n_1)-st discriminator loss by determining respective weights of the (1_1)-st discriminator loss to the (n_1)-st discriminator loss according to the region information on the 1-st training region to the n-th training region. In other words, the learning device may determine the respective weights of the (1_1)-st discriminator loss to the (n_1)-st discriminator loss by referring to the region information acquired from the labeling information for training or the heatmap for training. Also, the respective weights generated by referring to the region information may be further adjusted in response to performance of a learned obfuscation network 100.

Meanwhile, during the process of training the obfuscation network by using the accumulated loss, the learning device 1000 may perform or support another device to perform a process of applying a largest weight to a (k_1)-st discriminator loss, for a k-th training region, among the (1_1)-st discriminator loss to the (n_1)-st discriminator loss, wherein the k-th training region is among the 1-st training region to the n-th training region of the training image, and wherein k is an integer larger than or equal to 1 and smaller than or equal to n. In other words, parameters of the obfuscation network 100 corresponding to a k-th concealing process for concealing the k-th training region may be updated by back-propagation using the accumulated loss whose largest weight is allocated to the (k_1)-st discriminator loss. Accordingly, the learning device 1000 may train the obfuscation network 100 such that the 1-st discriminator 200_1 to the n-th discriminator 200_n may determine the obfuscated training image X' outputted from the obfuscation network 100 as real.

In addition, the learning device 1000 may generate an accuracy loss by referring to the feature information for training and its corresponding ground truth or by referring to a task-specific output and its corresponding ground truth, wherein the task-specific output is generated from the feature information for training. Herein, the task-specific output corresponding to the feature information for training may be a probability distribution generated by mapping the feature information for training for each class and thus information regarding the 1-st training region to the n-th training region on the training image X, such as classification information, location information, etc., may be acquired by using the task-specific output.

In detail, the task-specific output may be an output of a task to be performed by the image recognition network 300, and may have various results according to the task learned by the image recognition network 300, such as a probability of a class for classification, coordinates resulting from regression for location detection, etc., and an activation function of an activation unit may be applied to the feature information for training outputted from the image recognition network 300, to thereby generate the task-specific output according to the task to be performed by the image recognition network 300. Herein, the activation function may include a sigmoid function, a linear function, a softmax function, an rlinear function, a square function, an sqrt function, an srlinear function, an abs function, a tan h function, a brlinear function, etc. but the scope of the present disclosure is not limited thereto.

As one example, when the image recognition network 300 performs the task for the classification, the learning device 1000 may map the feature information for training outputted from the image recognition network 300 onto each of classes, to thereby generate one or more probabilities of the obfuscated training image X', for each of the classes.

Herein, the probabilities for each of the classes may represent probabilities of the feature information for training, outputted for each of the classes from the image recognition network 300, being correct. For example, if the training image X is a facial image, a probability of the face having a laughing expression may be outputted as 0.75, and a probability of the face not having the laughing expression may be outputted as 0.25, and the like. Herein, a softmax algorithm may be used for mapping the feature information for training outputted from the image recognition network 300 onto each of the classes, but the scope of the present disclosure is not limited thereto, and various algorithms may be used for mapping the feature information for training onto each of the classes.

Therefore, the learning device 1000 may train the obfuscation network 100 such that the accumulated loss is maximized and the accuracy loss is minimized. Herein, when the obfuscation network 100 is being trained, a regularization loss for parameters of the obfuscation network 100 may be further generated to train the obfuscation network 100, to thereby prevent an over-fitting and improve generalization performance.

Figure 6:
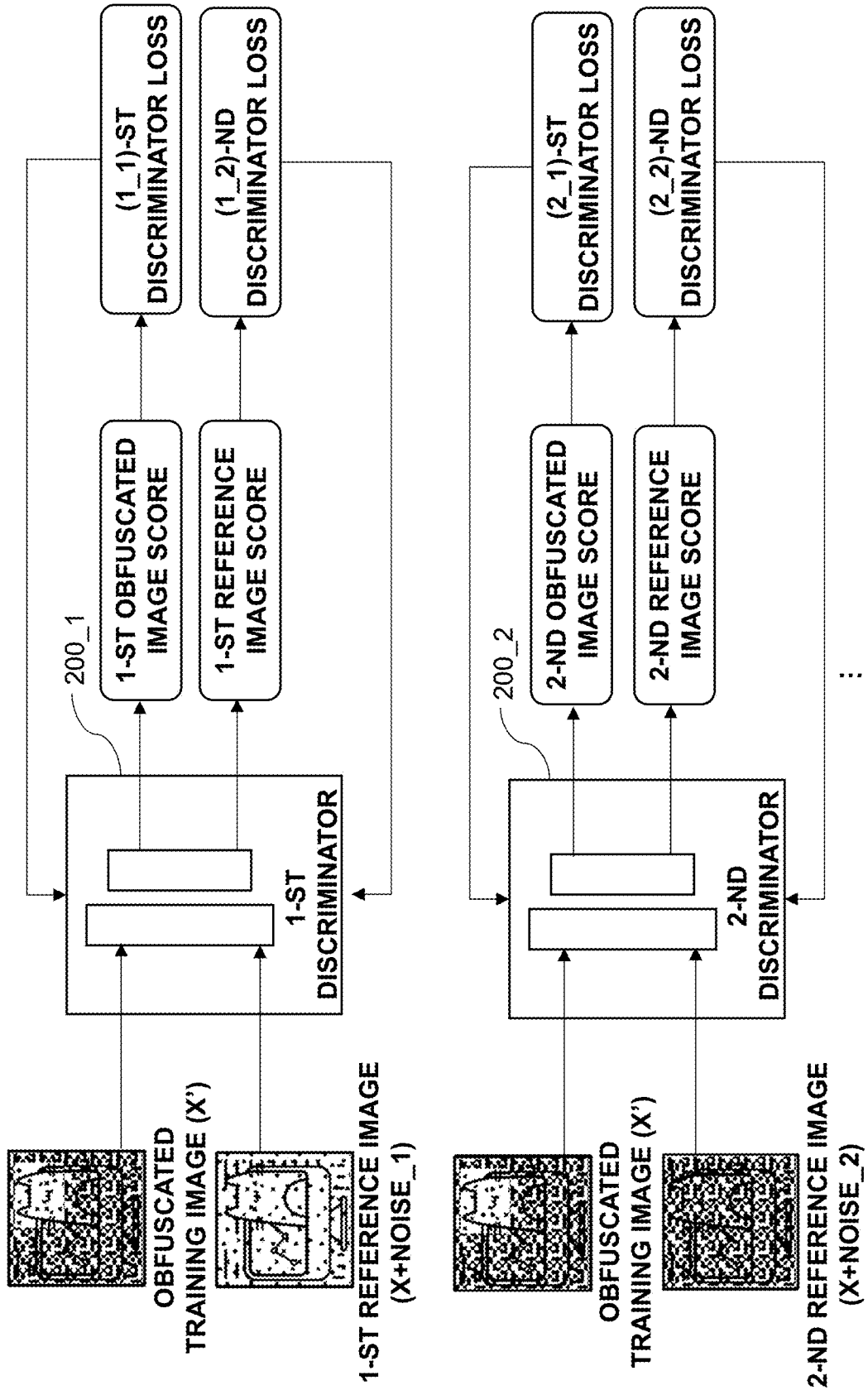
FIG. 6 is a drawing schematically illustrating a method for training discriminators in the method for training the obfuscation network capable of performing the distinct concealing processes for the distinct regions of the original image in accordance with one example embodiment of the present disclosure.

While training the obfuscation network 100 as described above, the learning device 1000, by referring to FIG. 6, may perform or support another device to perform a process of training the 1-st discriminator 200_1 to the n-th discriminator 200_n such that (i) the (1_1)-st discriminator loss to the (n_1)-st discriminator loss calculated by respectively referring to the 1-st obfuscated image score to the n-th obfuscated image score are minimized and (ii) a (1_2)-nd discriminator loss to an (n_2)-nd discriminator loss calculated by respectively referring to a 1-st reference image score to an n-th reference image score are maximized, wherein the 1-st reference image score to the n-th reference image score are generated by respectively referring to the 1-st reference image X+Noise_1 to the n-th reference image X+Noise n respectively inputted into the 1-st discriminator 200_1 to the n-th discriminator 200_n. That is, when training a k-th discriminator 200_k among the 1-st discriminator 200_1 to the n-th discriminator 200_n, the learning device 1000 may train the k-th discriminator 200_k such that the (k_1)-st discriminator loss is minimized and a (k_2)-nd discriminator loss is maximized. Accordingly, the learning device 1000 may train the 1-st discriminator 200_1 to the n-th discriminator 200_n such that each of the 1-st discriminator 200_1 to the n-th discriminator 200_n may determine the 1-st reference image X+Noise_1 to the n-th reference image X+Noise n respectively as real, and determine the obfuscated training image X' as fake.

Figure 7:
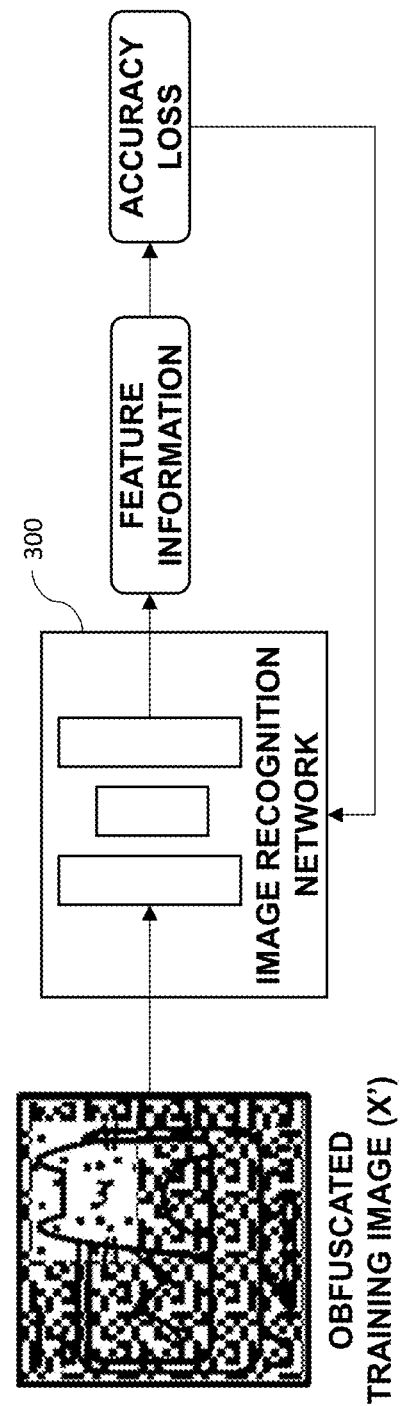
FIG. 7 is a drawing schematically illustrating a method for training an image recognition network in the method for training the obfuscation network capable of performing the distinct concealing processes for the distinct regions of the original image in accordance with one example embodiment of the present disclosure.

Next, by referring to FIG. 7, the learning device 1000 may perform or support another device to perform a process of training the image recognition network 300 such that the accumulated loss is minimized. On the other hand, the image recognition network 300 may be trained in advance by using the training image X, instead of training by using the accuracy loss.

Therefore, by using the processes described above, the obfuscation network 100, the 1-st discriminator 200_1 to the n-th discriminator 200_n, and the image recognition network 300 may be trained for each batch in each epoch.

On condition that the obfuscation network 100 has been trained as described above, a testing device may perform or support another device to perform a process of inputting a test image into the obfuscation network 100 whose training has been completed, to thereby allow the obfuscation network 100 to perform the concealing processes on the test image to produce an obfuscated test image that is recognized to be unidentifiable by the naked eyes but is recognized to be the same as or similar to the test image by the image recognition network 300.

Figure 8:
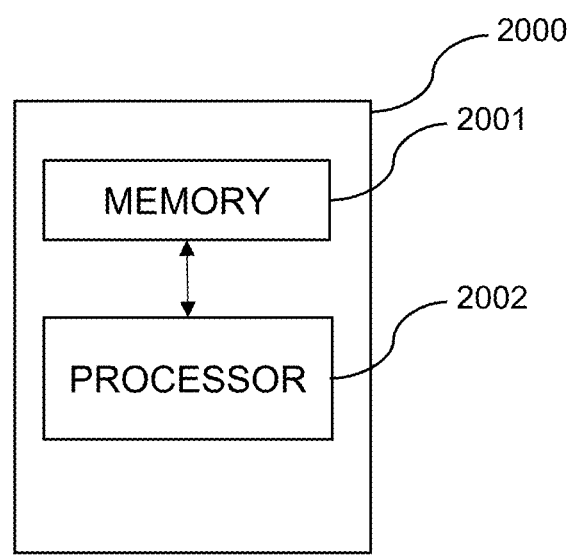
FIG. 8 is a drawing schematically illustrating a testing device for testing the obfuscation network capable of performing the distinct concealing processes for the distinct regions of the original image in accordance with one example embodiment of the present disclosure.

Accordingly, FIG. 8 is a drawing schematically illustrating a testing device 2000 for testing the obfuscation network 100 capable of performing the distinct concealing processes for the distinct regions of the original image in accordance with one example embodiment of the present disclosure.

By referring to FIG. 8, the testing device 2000 may include a memory 2001 for storing instructions to test the obfuscation network 100 capable of performing the distinct concealing processes for the distinct regions of the original image, and a processor 2002 for performing processes to test the obfuscation network 100 capable of performing the distinct concealing processes for the distinct regions of the original image according to the instructions in the memory 2001.

Specifically, the testing device 2000 may typically achieve a desired system performance by using combinations of at least one computing device and at least one computer software, e.g., a computer processor, a memory, a storage, an input device, an output device, or any other conventional computing components, an electronic communication device such as a router or a switch, an electronic information storage system such as a network-attached storage (NAS) device and a storage area network (SAN) as the computing device and any instructions that allow the computing device to function in a specific way as the computer software.

The processor of the computing device may include hardware configuration of MPU (Micro Processing Unit) or CPU (Central Processing Unit), cache memory, data bus, etc. Additionally, the computing device may further include OS and software configuration of applications that achieve specific purposes.

However, the case in which the computing device includes an integrated processor, integrating a medium, a processor and a memory, for implementing the present disclosure is not excluded.

Meanwhile, a device or a server capable of processing images such as a smartphone, a tablet, a personal computer (PC), a CCTV, an AI camera, an IoT device, a data processing device, a control device for an autonomous airplane or an autonomous vehicle, a control device for an unmanned robot, etc., may be used as the testing device 2000 for performing the concealing processes on the original image, and the testing device 2000 may be mounted on an image-producing server, an image-producing terminal, an image-producing device, or a computing device linked thereon to perform the concealing processes on the original image, but the present disclosure is not limited thereto.

Figure 9:
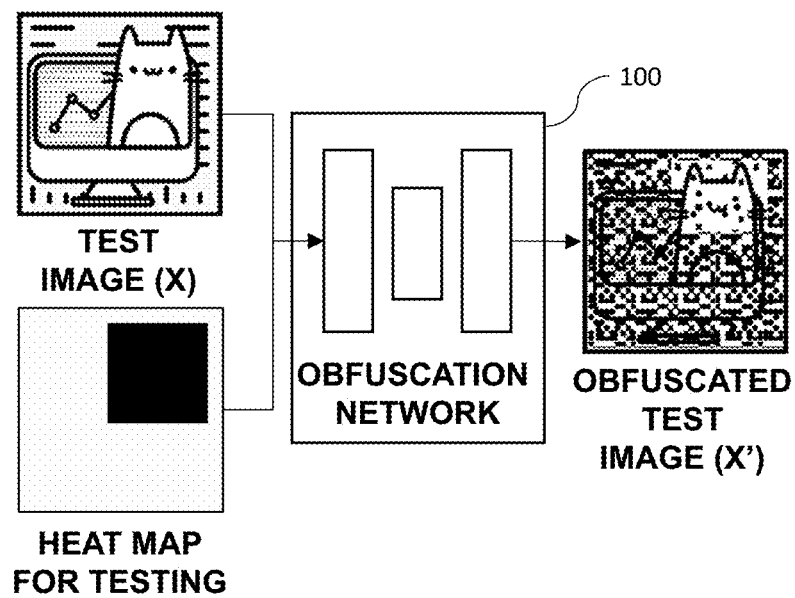
FIG. 9 is a drawing schematically illustrating a method for testing the obfuscation network capable of performing the distinct concealing processes for the distinct regions of the original image in accordance with one example embodiment of the present disclosure.

A method of testing the obfuscation network 100 capable of performing the distinct concealing processes for the distinct regions of the original image in accordance with one example embodiment of the present disclosure by using the testing device 2000 configured as explained above is described by referring to FIG. 9. In the description below, the part easily deducible from the explanation of FIG. 2 to FIG. 7 will be omitted.

On condition that the obfuscation network 100 has been trained by using the method described in FIG. 2 to FIG. 7, the testing device 2000, when the test image X is acquired, may perform or support another device to perform a process of inputting the test image X into the obfuscation network 100, to thereby allow the obfuscation network 100 to perform the 1-st concealing process to the n-th concealing process respectively on a 1-st test region to an n-th test region of the test image X and thus to generate at least one obfuscated test image X' corresponding to the test image X.

Herein, the obfuscation network 100 may generate the obfuscated test image X' by concealing the distinct regions of the test image X with the distinct concealing processes. For example, degrees of concealing of the distinct concealing processes may be varied such that the 1-st test region to the n-th test region of the test image X are concealed with distinct degrees of concealing. Also, the obfuscation network 100 may simultaneously perform the 1-st concealing process to the n-th concealing process such that the 1-st test region to the n-th test region of the test image X are respectively concealed with the 1-st concealing process to the n-th concealing process. That is, the obfuscation network 100 may conceal the test image X by conjointly using the 1-st concealing process to the n-th concealing process, so that the 1-st test region to the n-th test region of the test image X are respectively concealed with the 1-st concealing process to the n-th concealing process.

Herein, the testing device 2000 may perform or support another device to perform a process of determining the 1-st test region to the n-th test region in an order of decremental number of latent features such that (i) the 1-st test region includes a largest number of latent features among the 1-st test region to the n-th test region and (ii) the n-th test region includes a smallest number of latent features among the 1-st test region to the n-th test region. Therefore, the testing device 2000 may perform or support another device to perform a process of allowing the obfuscation network 100 to conceal the test image X with an incremental degree of noise such that (i) the 1-st test region is concealed with a lowest degree of noise through the 1-st concealing process and (ii) the n-th test region is concealed with a highest degree of noise through the n-th concealing process.

To this end, the testing device 2000 may perform or support another device to perform (i) a process of acquiring region information on the 1-st test region to the n-th test region from labeling information for testing which specifies the 1-st test region to the n-th test region, and inputting the region information into the obfuscation network 100, or (ii) a process of inputting the test image X into the attention network, to thereby allow the attention network to generate a heatmap for testing corresponding to the test image X, acquiring the region information on the 1-st test region to the n-th test region from the heatmap for testing, and inputting the region information into the obfuscation network 100.

Herein, in the process of acquiring the region information on the 1-st test region to the n-th test region from the labeling information for testing which specifies the 1-st test region to the n-th test region, the region information may be generated by manually setting the 1-st test region to the n-th test region. On the other hand, the labeling information for testing may also be generated using the machine learning based segmentation network by segmenting the test image X into the 1-st test region to the n-th test region, or using the machine learning based regression network by obtaining bounding boxes of objects included in the test image X.

Accordingly, when the region information is acquired, the testing device 2000 may input the region information into the obfuscation network 100, to thereby allow the obfuscation network 100 to perform the 1-st concealing process to the n-th concealing process corresponding respectively to the region information on the 1-st test region to the n-th test region.

On the other hand, in the process of inputting the test image X into the attention network, to thereby allow the attention network to generate the heatmap for testing corresponding to the test image X, the testing device 2000 may input the test image X into the attention network, to thereby allow the attention network to highlight specific regions containing richer number of latent features in comparison to the other regions of the test image X. Herein, said "richer number of latent features" may be determined as a number of latent features larger than the preset threshold. Also, the specific regions containing richer number of the latent features may include analyzable features such as texts, humans, animals, vehicles, faces, buildings, etc. Further, depending on which purpose the obfuscated test image X' is being used, the latent features detected may vary. To provide an example, when the obfuscated test image X' is used for traffic scene analysis, features such as pedestrians, vehicles, road signs, lanes, etc., may be detected as the latent features on the test image X. Herein, the attention network used for generating the heatmap for testing may have been trained in advance.

Herein, said attention network adopted in the present disclosure may be included in a particular network configuration necessary for carrying out a particular task of generating the heatmap for testing, such as by referring to the regions that are highlighted. Further, following the present disclosure, the attention network may be located externally to generate the heatmap for testing, but the present disclosure may also encompass cases where the attention network is incorporated into or linked to the obfuscation network 100 to directly generate the heatmap for testing.

Herein, the present disclosure may determine at least some parts of the test image X as the 1-st test region to the n-th test region so that only those parts marked as the 1-st test region to the n-th test region are respectively concealed with the 1-st concealing process to the n-th concealing process. In other words, the obfuscated test image X' generated by the obfuscation network 100 may have its entire region concealed by the distinct concealing processes or only some parts of its entire region concealed by the distinct concealing processes.

Herein, the obfuscated test image X' generated by the obfuscation network 100 may be recognized to be unidentifiable by the naked eyes, but may be recognized to be similar to or the same as the test image X in the learning networks.

Unlike acquiring the region information on the 1-st test region to the n-th test region from the labeling information for testing or the heatmap for testing as described above, the obfuscation network 100 may also be tested by generating the region information on the 1-st test region to the n-th test region on its own.

Meanwhile, obfuscated data which are concealed by the learned obfuscation network in accordance with the present disclosure may be provided or sold to a buyer of big data. Also, the obfuscated data may be transmitted to a third-party or other institutions such that the obfuscated data can be used for purposes such as research, statistical analysis, etc., by the third-party or the institutions without an exposure of private information.

Also, in accordance with the present disclosure, when the obfuscated data are provided or sold to the buyer, the testing method of the learned obfuscation network may be provided as implemented in a form of program instructions executable by a variety of computer components and recorded to computer readable media. In accordance with one example embodiment of the present disclosure, the buyer may execute the program instructions recorded in the computer readable media by using the computer devices, to thereby generate the obfuscated data from the original data owned by the buyer or acquired from other sources, and use the obfuscated data for his/her own learning network. Also, the buyer may use at least two of the obfuscated data, the original image data owned by the buyer or acquired from other sources, and the obfuscated data provided or sold to the buyer, together for the buyer's learning network.

Meanwhile, in accordance with the present disclosure, if the testing method of the learned obfuscation network is implemented as the program instructions that can be executed by a variety of computer components, then computational overhead may occur in the computing devices of the buyer when the accuracy is set as high, thus the buyer is allowed to lower the accuracy to prevent the computational overhead.

The present disclosure has an effect of generating the obfuscated image by concealing the original image such that the obfuscated image is unidentifiable by the naked eyes while is recognized to be the same as the original image in the learning networks.

The present disclosure has another effect of performing the concealing processes sufficient enough to make it impossible to infer important features from the obfuscated image while preserving the important features to be used for training the learning networks.

The present disclosure has still another effect of generating the obfuscated image by concealing the original image such that the obfuscated image is unidentifiable by naked eyes while specific regions on the obfuscated image are recognized to be the same as or similar to their corresponding specific regions of the original image in the learning networks.

The present disclosure has still yet another effect of generating the obfuscated image by irreversibly performing the concealing processes on a 1-st region to an n-th region of the original image such that the obfuscated image does not include any information identifiable by the naked eyes.

The present disclosure has still yet another effect of customizing the concealing processes according to specific uses of the obfuscated images by performing varying degrees of concealing on different regions of the original image.

The present disclosure has still yet another effect of stimulating big data trading market.

The embodiments of the present disclosure as explained above can be implemented in a form of executable program command through a variety of computer means recordable to computer readable media. The computer readable media may include solely or in combination, program commands, data files, and data structures. The program commands recorded to the media may be components specially designed for the present disclosure or may be usable to a skilled human in a field of computer software. Computer readable media include magnetic media such as hard disk, floppy disk, and magnetic tape, optical media such as CD-ROM and DVD, magneto-optical media such as floptical disk and hardware devices such as ROM, RAM, and flash memory specially designed to store and carry out program commands. Program commands may include not only a machine language code made by a complier but also a high level code that can be used by an interpreter etc., which is executed by a computer. The aforementioned hardware device can work as more than a software module to perform the action of the present disclosure and they can do the same in the opposite case.

As seen above, the present disclosure has been explained by specific matters such as detailed components, limited embodiments, and drawings. They have been provided only to help more general understanding of the present disclosure. It, however, will be understood by those skilled in the art that various changes and modification may be made from the description without departing from the spirit and scope of the disclosure as defined in the following claims.

Accordingly, the thought of the present disclosure must not be confined to the explained embodiments, and the following patent claims as well as everything including variations equal or equivalent to the patent claims pertain to the category of the thought of the present disclosure.

What is claimed is:

1. A method for training an obfuscation network capable of performing distinct concealing processes for distinct regions of an original image, comprising steps of:
   (a) a learning device performing or supporting another device to perform a process of inputting at least one training image into an obfuscation network, to thereby allow the obfuscation network to perform a 1-st concealing process to an n-th concealing process respectively on a 1-st training region to an n-th training region of the training image, wherein n is an integer larger than or equal to 2, and thus to generate at least one obfuscated training image corresponding to the training image;
   (b) the learning device performing or supporting another device to perform processes of (i) inputting the obfuscated training image into a 1-st discriminator to an n-th discriminator capable of determining a 1-st reference image to an n-th reference image respectively as real, wherein the 1-st reference image to the n-th reference image are respectively generated by applying the 1-st concealing process to the n-th concealing process to an entire region of the training image, to thereby allow the 1-st discriminator to the n-th discriminator to respectively generate a 1-st obfuscated image score to an n-th obfuscated image score on determining whether the obfuscated training image is real or fake, and (ii) inputting the obfuscated training image into an image recognition network, to thereby allow the image recognition network to apply learning operation on the obfuscated training image and thus to generate feature information for training corresponding to the obfuscated training image; and (c) the learning device performing or supporting another device to perform a process of training the obfuscation network such that (i) an accumulated loss generated by computing a weighted sum of a $(1\_1)$-st discriminator loss to an $(n\_1)$-st discriminator loss is maximized, wherein the $(1\_1)$-st discriminator loss to the $(n\_1)$-st discriminator loss are generated by respectively referring to the 1-st obfuscated image score to the n-th obfuscated image score, and (ii) an accuracy loss generated by referring to the feature information for training and its corresponding ground truth or generated by referring to a task-specific output and its corresponding ground truth is minimized, wherein the task-specific output is generated from the feature information for training.

2. The method of claim 1, further comprising a step of:
(d) the learning device performing or supporting another device to perform a process of training the 1-st discriminator to the n-th discriminator such that (i) the $(1\_1)$-st discriminator loss to the $(n\_1)$-st discriminator loss calculated by respectively referring to the 1-st obfuscated image score to the n-th obfuscated image score are minimized and (ii) a $(1\_2)$-nd discriminator loss to an $(n\_2)$-nd discriminator loss calculated by respectively referring to a 1-st reference image score to an n-th reference image score are maximized, wherein the 1-st reference image score to the n-th reference image score are generated by respectively referring to the 1-st reference image to the n-th reference image respectively inputted into the 1-st discriminator to the n-th discriminator.

3. The method of claim 2, further comprising a step of:
(e) the learning device performing or supporting another device to perform a process of training the image recognition network such that the accumulated loss is minimized.

4. The method of claim 1, wherein, during the process of training the obfuscation network by using the accumulated loss, the learning device performs or supports another device to perform a process of applying a largest weight to a $(k\_1)$-st discriminator loss, for a k-th training region, among the $(1\_1)$-st discriminator loss to the $(n\_1)$-st discriminator loss, wherein the k-th training region is among the 1-st training region to the n-th training region of the training image, and wherein k is an integer larger than or equal to 1 and smaller than or equal to n.

5. The method of claim 1, wherein the learning device performs or supports another device to perform a process of allowing the obfuscation network to conceal the training image such that (i) the 1-st training region is concealed with a lowest degree of noise through the 1-st concealing process and (ii) the n-th training region is concealed with a highest degree of noise through the n-th concealing process.

6. The method of claim 5, wherein the learning device performs or supports another device to perform a process of determining the 1-st training region to the n-th training region such that (i) the 1-st training region includes a largest number of latent features among the 1-st training region to the n-th training region and (ii) the n-th training region includes a smallest number of latent features among the 1-st training region to the n-th training region.

7. The method of claim 1, wherein the learning device performs or supports another device to perform (i) a process of acquiring region information on the 1-st training region to the n-th training region from labeling information for training which specifies the 1-st training region to the n-th training region, and inputting the region information into the obfuscation network, or (ii) a process of inputting the training image into an attention network, to thereby allow the attention network to generate a heatmap for training corresponding to the training image, acquiring the region information on the 1-st training region to the n-th training region from the heatmap for training, and inputting the region information into the obfuscation network.

8. A method for testing an obfuscation network capable of performing distinct concealing processes for distinct regions of an original image, comprising steps of:
(a) on condition that a learning device has performed or supported another device to perform processes of (i) inputting at least one training image into an obfuscation network, to thereby allow the obfuscation network to perform a 1-st concealing process to an n-th concealing process respectively on a 1-st training region to an n-th training region of the training image, wherein n is an integer larger than or equal to 2, and thus to generate at least one obfuscated training image corresponding to the training image, (ii) (ii-1) inputting the obfuscated training image into a 1-st discriminator to an n-th discriminator capable of determining a 1-st reference image to an n-th reference image respectively as real, wherein the 1-st reference image to the n-th reference image are respectively generated by applying the 1-st concealing process to the n-th concealing process to an entire region of the training image, to thereby allow the 1-st discriminator to the n-th discriminator to respectively generate a 1-st obfuscated image score to an n-th obfuscated image score on determining whether the obfuscated training image is real or fake, and (ii-2) inputting the obfuscated training image into an image recognition network, to thereby allow the image recognition network to apply learning operation on the obfuscated training image and thus to generate feature information for training corresponding to the obfuscated training image, and (iii) training the obfuscation network such that (iii-1) an accumulated loss generated by computing a weighted sum of a $(1\_1)$-st discriminator loss to an $(n\_1)$-st discriminator loss is maximized, wherein the $(1\_1)$-st discriminator loss to the $(n\_1)$-st discriminator loss are generated by respectively referring to the 1-st obfuscated image score to the n-th obfuscated image score, and (iii-2) an accuracy loss generated by referring to the feature information for training and its corresponding ground truth or generated by referring to a task-specific output and its corresponding ground truth is minimized, wherein the task-specific output is generated from the feature information for training, a testing device, performing or supporting another device to perform a process of acquiring at least one test image; and (b) the testing device performing or supporting another device to perform a process of inputting the test image into the obfuscation network, to thereby allow the obfuscation network to perform the 1-st concealing process to the n-th concealing process respectively on a 1-st test region to an n-th test region of the test image and thus to generate at least one obfuscated test image corresponding to the test image.

9. The method of claim 8, wherein the testing device performs or supports another device to perform a process of allowing the obfuscation network to conceal the test image such that (i) the 1-st test region is concealed with a lowest degree of noise through the 1-st concealing process and (ii) the n-th test region is concealed with a highest degree of noise through the n-th concealing process.

10. The method of claim 9, wherein the testing device performs or supports another device to perform a process of determining the 1-st test region to the n-th test region such that (i) the 1-st test region includes a largest number of latent features among the 1-st test region to the n-th test region and (ii) the n-th test region includes a smallest number of latent features among the 1-st test region to the n-th test region.

11. The method of claim 8, wherein the testing device performs or supports another device to perform (i) a process of acquiring region information on the 1-st test region to n-th test region from labeling information for testing which specifies the 1-st test region to the n-th test region, and inputting the region information into the obfuscation network, or (ii) a process of inputting the test image into an attention network, to thereby allow the attention network to generate a heatmap for testing corresponding to the test image, acquiring the region information on the 1-st test region to the n-th test region from the heatmap for testing, and inputting the region information into the obfuscation network.

12. A leaning device for training an obfuscation network capable of performing distinct concealing processes for distinct regions of an original image, comprising:
at least one memory that stores instructions; and
at least one processor configured to execute the instructions to perform or support another device to perform: (I) a process of inputting at least one training image into an obfuscation network, to thereby allow the obfuscation network to perform a 1-st concealing process to an n-th concealing process respectively on a 1-st training region to an n-th training region of the training image, wherein n is an integer larger than or equal to 2, and thus to generate at least one obfuscated training image corresponding to the training image, (II) processes of (i) inputting the obfuscated training image into a 1-st discriminator to an n-th discriminator capable of determining a 1-st reference image to an n-th reference image respectively as real, wherein the 1-st reference image to the n-th reference image are respectively generated by applying the 1-st concealing process to the n-th concealing process to an entire region of the training image, to thereby allow the 1-st discriminator to the n-th discriminator to respectively generate a 1-st obfuscated image score to an n-th obfuscated image score on determining whether the obfuscated training image is real or fake, and (ii) inputting the obfuscated training image into an image recognition network, to thereby allow the image recognition network to apply learning operation on the obfuscated training image and thus to generate feature information for training corresponding to the obfuscated training image, and (III) a process of training the obfuscation network such that (i) an accumulated loss generated by computing a weighted sum of a $(1\_1)$-st discriminator loss to an $(n\_1)$-st discriminator loss is maximized, wherein the $(1\_1)$-st discriminator loss to the $(n\_1)$-st discriminator loss are generated by respectively referring to the 1-st obfuscated image score to the n-th obfuscated image score, and (ii) an accuracy loss generated by referring to the feature information for training and its corresponding ground truth or generated by referring to a task-specific output and its corresponding ground truth is minimized, wherein the task-specific output is generated from the feature information for training.

13. The learning device of claim 12, wherein the processor performs or supports another device to perform: (IV) a process of training the 1-st discriminator to the n-th discriminator such that (i) the $(1\_1)$-st discriminator loss to the $(n\_1)$-st discriminator loss calculated by respectively referring to the 1-st obfuscated image score to the n-th obfuscated image score are minimized and (ii) a $(1\_2)$-nd discriminator loss to an $(n\_2)$-nd discriminator loss calculated by respectively referring to a 1-st reference image score to an n-th reference image score are maximized, wherein the 1-st reference image score to the n-th reference image score are generated by respectively referring to the 1-st reference image to the n-th reference image respectively inputted into the 1-st discriminator to the n-th discriminator.

14. The learning device of claim 13, wherein the processor performs or supports another device to perform: (V) a process of training the image recognition network such that the accumulated loss is minimized.

15. The learning device of claim 12, wherein, during the process of training the obfuscation network by using the accumulated loss, the processor performs or supports another device to perform a process of applying a largest weight to a $(k\_1)$-st discriminator loss, for a k-th training region, among the $(1\_1)$-st discriminator loss to the $(n\_1)$-st discriminator loss, wherein the k-th training region is among the 1-st training region to the n-th training region of the training image, and wherein k is an integer larger than or equal to 1 and smaller than or equal to n.

16. The learning device of claim 12, wherein the processor performs or supports another device to perform a process of allowing the obfuscation network to conceal the training image such that (i) the 1-st training region is concealed with a lowest degree of noise through the 1-st concealing process and (ii) the n-th training region is concealed with a highest degree of noise through the n-th concealing process.

17. The learning device of claim 16, wherein the processor performs or supports another device to perform a process of determining the 1-st training region to the n-th training region such that (i) the 1-st training region includes a largest number of latent features among the 1-st training region to the n-th training region and (ii) the n-th training region includes a smallest number of latent features among the 1-st training region to the n-th training region.

18. The learning device of claim 12, wherein the processor performs or supports another device to perform (i) a process of acquiring region information on the 1-st training region to the n-th training region from labeling information for training which specifies the 1-st training region to the n-th training region, and inputting the region information into the obfuscation network, or (ii) a process of inputting the training image into an attention network, to thereby allow the attention network to generate a heatmap for training corresponding to the training image, acquiring the region information on the 1-st training region to the n-th training region from the heatmap for training, and inputting the region information into the obfuscation network.

19. A testing device for testing an obfuscation network capable of performing distinct concealing processes for distinct regions of an original image, comprising:
- at least one memory that stores instructions; and
- at least one processor configured to execute the instructions to perform or support another device to perform: (I) on condition that a learning device has performed or supported another device to perform processes of (i) inputting at least one training image into an obfuscation network, to thereby allow the obfuscation network to perform a 1-st concealing process to an n-th concealing process respectively on a 1-st training region to an n-th training region of the training image, wherein n is an integer larger than or equal to 2, and thus to generate at least one obfuscated training image corresponding to the training image, (ii) (ii-1) inputting the obfuscated training image into a 1-st discriminator to an n-th discriminator capable of determining a 1-st reference image to an n-th reference image respectively as real, wherein the 1-st reference image to the n-th reference image are respectively generated by applying the 1-st concealing process to the n-th concealing process to an entire region of the training image, to thereby allow the 1-st discriminator to the n-th discriminator to respectively generate a 1-st obfuscated image score to an n-th obfuscated image score on determining whether the obfuscated training image is real or fake, and (ii-2) inputting the obfuscated training image into an image recognition network, to thereby allow the image recognition network to apply learning operation on the obfuscated training image and thus to generate feature information for training corresponding to the obfuscated training image, and (iii) training the obfuscation network such that (iii-1) an accumulated loss generated by computing a weighted sum of a (1_1)-st discriminator loss to an (n_1)-st discriminator loss is maximized, wherein the (1_1)-st discriminator loss to the (n_1)-st discriminator loss are generated by respectively referring to the 1-st obfuscated image score to the n-th obfuscated image score, and (iii-2) an accuracy loss generated by referring to the feature information for training and its corresponding ground truth or generated by referring to a task-specific output and its corresponding ground truth is minimized, wherein the task-specific output is generated from the feature information for training, (I-1) a process of acquiring at least one test image, and (II) a process of inputting the test image into the obfuscation network, to thereby allow the obfuscation network to perform the 1-st concealing process to the n-th concealing process respectively on a 1-st test region to an n-th test region of the test image and thus to generate at least one obfuscated test image corresponding to the test image.

20. The testing device of claim 19, wherein the processor performs or supports another device to perform a process of allowing the obfuscation network to conceal the test image such that (i) the 1-st test region is concealed with a lowest degree of noise through the 1-st concealing process and (ii) the n-th test region is concealed with a highest degree of noise through the n-th concealing process.

21. The testing device of claim 20, wherein the processor performs or supports another device to perform a process of determining the 1-st test region to the n-th test region such that (i) the 1-st test region includes a largest number of latent features among the 1-st test region to the n-th test region and (ii) the n-th test region includes a smallest number of latent features among the 1-st test region to the n-th test region.

22. The testing device of claim 19, wherein the processor performs or supports another device to perform (i) a process of acquiring region information on the 1-st test region to n-th test region from labeling information for testing which specifies the 1-st test region to the n-th test region, and inputting the region information into the obfuscation network, or (ii) a process of inputting the test image into an attention network, to thereby allow the attention network to generate a heatmap for testing corresponding to the test image, acquiring the region information on the 1-st test region to the n-th test region from the heatmap for testing, and inputting the region information into the obfuscation network.

* * * * *